Patented Aug. 17, 1954

2,686,762

UNITED STATES PATENT OFFICE 2,686,762

CONDITIONING OF SILVER BASE CATALYSTS FOR THE OXIDATION OF ETHYLENE

Eric L. Tollefson, Tulsa, Okla., assignor to National Research Council, Ottawa, Ontario, Canada, a body corporate of Canada No Drawing. Application March 10, 1953, Serial No. 341,593

13 Claims. (Cl. 252—411)

The present invention relates to a novel and improved catalyst for the catalytic oxidation of hydrocarbons, such as ethylene, and to an improved process for preparing such catalysts.

Objects and advantages of the invention will be set forth in part hereinafter and in part will be obvious herefrom, or may be learned by practice with the invention, the same being realized and attained by means of the steps, processes and compositions pointed out in the appended claims.

The invention consists in the novel steps, processes, compositions and improvements herein shown and described.

The present invention has for its object the provision of a novel and improved catalyst for the oxidation of hydrocarbons such as ethylene, which catalyst rapidly attains its maximum activity in the production of ethylene oxide and retains this maximum activity over a long period of time, thereby reducing the amount of time required for the catalyst to attain its maximum activity in production of the desired product. A further object is the provision of an improved and relatively simple process for the preparation of such catalysts.

The present invention provides a novel and improved catalyst, and process of preparing the same, of the general types described in the prior United States patent of Adrien Cambron and Francis L. W. McKim, No. 2,562,858, granted July 31, 1951, and Canadian Patent No. 475,365, patented July 17, 1951, and is in the nature of an improvement upon the process and catalyst described in said patents, although in some respects the present invention is of wider application.

As disclosed in said patents, an oxidation catalyst for the oxidation of a flowing mixture of air and ethylene, or other hydrocarbon gas or vapor, is formed from an alloy of silver with from 1 to 75% of an alkaline earth metal, treated with steam and then subjected to an etching or leaching treatment by which about 5% or more of the alkaline earth metal, preferably calcium, is removed from the alloy to render the alloy catalytically active for the oxidation process.

While such catalysts are highly efficient catalysts and have a long life, a considerable period of time is often required for the catalyst to attain its maximum activity in ethylene oxide production, resulting in a considerable loss not only by inefficient operation of the apparatus used for the catalytic oxidation of the hydrocarbon, and by a considerable period of time during which the hydrocarbon is not efficiently converted into the desired oxidation product, but also in the considerable number of man-hours of careful attention, during which time the operation of the catalytic process must be supervised closely and with great skill to maintain the proper rate of reaction until the catalyst has attained a fairly level range of activity, after which the close supervision can be relaxed. Thus, in many instances as long as nine days has been required for the catalyst to attain a stable state, while with the present invention, such results are obtained in a much shorter period.

According to the process of the present invention, silver-alkaline earth metal alloys, which may contain small amounts of nickel, treated to remove a substantial portion of the alkaline earth metal from at least the surface portion of the alloy without substantial removal of the silver, are conditioned by flowing carbon dioxide at temperatures ranging between 260° and 350° C., thereby preparing the catalyst for use in the oxidation reaction, so that it achieves its period of peak conversion and selectivity to ethylene oxide with a relatively short time of operation in the oxidizing reaction, and maintains that conversion and selectivity to ethylene oxide over long periods of time.

The alloys useful in forming the catalysts employed in the present invention may be in accordance with said prior patents and contain silver and from 1 to 75% of an alkaline earth metal, such as calcium, strontium, barium or magnesium, or may be silver alloys containing two or more of the alkaline earth metals, such as calcium and magnesium, or less preferably calcium and strontium or barium, or magnesium and strontium or barium, or strontium and barium. The alloys from which the catalyst is formed may include some nickel.

Where the alloy is to be formed into coarse grains, it is usually preferable to use silver alloys which contain from about 5% to about 15% of one or more of the alkaline earth metals, but the alkaline earth metals may be applied to a silver sheet metal base member by dipping the silver sheet metal base member in a molten bath of the alkaline earth metals, in inert atmosphere, such as argon or helium, preferably being used where the temperature of dipping is about 550° C. or higher. Also, in case it is desired to use a sheet metal base of a metal other than silver, the sheet metal base may be dipped in a molten silver alloy containing substantial amounts of one or more of the alkaline earth metals, preferably with small additions of nickel, Where the dipping technique is employed for the coating of the catalytic alloy onto a sheet metal base, the alloy preferably includes at least 25% of silver, although, if the molten alloy is deficient in silver and the alloy is to be coated onto a sheet metal base which has a surface of silver, the deficiency can be overcome by annealing the alloy coated silver surface, whereby the alloy dissolves in the silver surface and is thereby enriched in its silver content.

Among the alkaline earth metal alloys which are preferred for application to silver surfaces by dipping are the following:

Alloys of calcium and magnesium, preferably the eutectic containing 78.5% calcium and 21.5% magnesium.

Alloys of silver and alkaline earth metals comprising silver and from 1 to 75% of alkaline earth metal, preferably calcium.

Alloys of silver and two or more of the alkaline earth metals, preferably ternary alloys which have compositions as follows, some of which are substantially eutectic:

| Silver, Percent | Calcium, Percent | Magnesium, Percent | Approx. M. P., ° C. |
|---|---|---|---|
| 92 | 5 | 3 | 633 |
| 79.5 | 14.8 | 5.7 | 467 |
| 8 | 75 | 17 | 419 |
| 43 | 17 | 40 | 440 |
| 5 | 75 | 20 | 430 |
| 36.3 | 49.4 | 13.4 | 381 | to any of which alloys may be added from 0.1% to 3.0% of nickel, preferably in the form of a magnesium-nickel eutectic alloy (23.5% nickel, M. P. 507° C.).

Thus the alloy for application to silver bearing surfaces may comprise alloys of two or more of the alkaline earth metals, or of silver with one or more of the alkaline earth metals. If the alloy is one which is to be applied to a heat-conductive metal base, such as an aluminum, copper, brass or stainless steel base, the alloy comprises a silver-alkaline earth metal alloy which is relatively rich in silver. With those alloys relatively poor in silver which are applied to a silver-coated or solid silver base, and after they have been annealed, the alloys are enriched with silver. With those alloys which are relatively high in alkaline earth metal content and have a substantial portion of the alkaline earth metal removed from the surface of the alloy by etching, the surface of the alloy is thereby relatively enriched in silver so that it includes at least about 25% silver, and often reaches a silver content as high as 99% silver. Where nickel is used, the etched surface of the alloy may contain from about 24% silver with or without 0.01% to about 3.0% of nickel and from about 71% of alkaline earth metal to as little as a trace of alkaline earth metal, the remainder of the alloy being silver.

While other alkaline earth metals than calcium and magnesium may be employed, calcium and magnesium are preferred as the principal constituents due to the lower melting points of their alloys.

Where the dipping technique is employed, the alloy coated sheets are preferably annealed by heating for periods of from 20 minutes to one or two hours at temperatures ranging from about 400° to 660° C., advantageously from 450° to about 650° and most preferably at about 500° C. to 640° C.

The catalytic alloy is activated by treatment with moist air, steam or superheated water for periods of from 10 to 20 minutes to several hours at temperatures ranging from above boiling to as high as 350° C. or more, or for longer periods of time in warm water, after which from 5% to all but a trace of the alkaline earth metal is leached out of the alloy or at least from the surface of the granular or sheet alloy by treatment with dilute acid, such as a 5% to 50% solution of acetic acid or formic acid, preferably about a 20% solution of the acid, together, if desired with small additions of oxidizing agents such as potassium permanganate or hydrogen peroxide, after which the alloy is thoroughly washed.

Such alloys may be effectively used without further treatment for the catalytic oxidation of ethylene and other hydrocarbons in accordance with said prior patents or the process of the prior patent to Cambron and McKim, United States No. 2,562,857 of July 31, 1951.

However, in accordance with the improvements of the present invention, the catalytic alloys preferably include nickel as described above and are preferably conditioned for use and have their initial activity in the production of ethylene oxide enhanced by a further treatment which comprises subjecting the catalytic alloy in its granular or sheet form to further treatment which comprises treating the alloy containing silver and the alkaline earth metal which remains after etching or leaching with carbon dioxide at elevated temperatures of from about 260° to about 350° C. for extended periods of time from several hours to several days, the carbon dioxide being replenished from time to time or being continuously flowed over the catalytic alloy while it is maintained heated in a closed vessel. In general, it has been found that the optimum time of treatment with carbon dioxide for the catalytic alloy is about three days and that the optimum temperature of treatment is about 290° C. Longer periods of treatment give increased initial catalytic activity to the alloy but not at a sufficiently increased rate to justify the additional time of treatment, and the greatest increase in initial activity is noted in the first three days of treatment.

During this treatment, the leached catalytic alloy is preferably enclosed in a vessel and maintained at the desired temperature while a stream of relatively pure carbon dioxide is flowed over it, and such operation requires no elaborate apparatus, nor expenditure of useful hydrocarbons, nor any close attention on the part of the operator who need only occasionally regulate the flow of carbon dioxide and observe that the desired temperature is maintained.

Some of the improved results of the present invention are achieved by the use of those catalytic alloys of the present invention which include the minor amounts of nickel, combined with silver and one or more of the alkaline earth metals, from which some or all but a trace of the alkaline earth metal has been removed by leaching or etching and without treatment of the alloy with carbon dioxide at elevated temperatures. Such alloys have an extended life with respect to the alloys which exclude nickel from their compositions, but these alloys, together with those which omit the nickel addition, are greatly improved both in their initial conversion and selectivity to ethylene oxide as well as in their life by the treatment with carbon dioxide at elevated temperatures.

The following detailed examples are illustrative of the preferred manner of carrying out the process of the present invention, and are exemplary of the invention.

Example 1

An alloy comprising 85.9% silver, 11.6% calcium, and 2.5% magnesium in granular form with particles from about 0.4 to about 0.8 mm. in size was activated by treatment with high temperature steam followed by etching with a 20% aqueous solution of acetic acid, after which it was conditioned to enhance its catalytic activity by treatment with flowing carbon dioxide at 260° C. in a closed vessel, the carbon dioxide treatment being continued for a period of three days. The conditioned catalyst was then placed in a reaction block and a mixture of ethylene and air was passed over it, the rate of flow being 2 litres of ethylene and 30 litres of air per hour. After activation (and before treatment with carbon dioxide) the catalyst alloy had a composition of 99.6% silver, 0.4% calcium, and no magnesium.

With a reaction temperature of 260° C. there was a yield of 48% ethylene oxide and 52% carbon dioxide after four days of operation and this yield was maintained for long periods of time.

Under similar conditions, a similar catalyst which had not been subjected to the treatment with carbon dioxide at elevated temperatures gave a yield of only 39% ethylene oxide and 61% carbon dioxide after 7 days of operation.

Example 2

An alloy comprising 89.2% silver, 10.0% calcium and 0.77% nickel before activation and comprising 98.6% silver, 0.66% calcium and 0.77% nickel after activation, was conditioned by treatment with carbon dioxide for three days at a temperature of 290° C. and then tested under similar conditions. This catalytic alloy produced a yield of 50% ethylene oxide and 50% carbon dioxide after four days of operation, while a similar alloy under the same conditions, but without the conditioning treatment with carbon dioxide at elevated temperatures yielded only 44% ethylene oxide and 56% carbon dioxide after 7 days of operation.

The catalysts of both Examples 1 and 2 required only 4 days on stream to reach the same yield as was achieved in 9 days on stream by the catalysts which had not been conditioned in the manner specified.

Example 3

An alloy which contained 89.6% silver, 10.2% calcium and 0.2% nickel before activation, and 99.83% silver, 0.35% calcium and 0.02% nickel after activation in the usual manner by treatment with steam and later etching with dilute acetic acid gave a relatively low conversion of ethylene and air to ethylene oxide and carbon dioxide in the reaction block under the conditions specified above during its first 15 or 20 days of operation and proved more difficult to control as to temperature than similar catalysts which included no nickel. However, after this initial period and continuing for as much as one hundred days longer, the conversion of ethylene to ethylene oxide was as much as 5% higher than for those similar catalysts which included no nickel, and thereafter, the nickel containing catalyst maintained its high conversion better than the nickel free catalysts.

Example 4

Another catalyst containing 89.85% silver, 10.0% calcium and 0.15% nickel before activation and 99.65% silver, 0.34% calcium and 0.01% nickel after activation gave similar results.

Example 5

A granular catalyst having particles ranging from about 0.4 to 0.8 mm. in size and formed from an alloy having an initial composition of 89.4% silver, 8.2% calcium and 2.4% nickel was activated in 90% nitrogen, 10% steam for one hour at 350° C. and then with 100% steam for 5 hours at 375° C., after which the product was boiled in 20% acetic acid for one hour and in a fresh portion for 45 minutes, then washed three times with water, boiled in fresh water, again washed in water and then in methanol and dried. It had a composition of 99.25% silver, 0.50% calcium and 0.25% nickel after activation. Using such a catalyst in a reaction block with a flow of 2 litres of ethylene and 30 litres of air per hour and an initial reaction temperature of 200° C. a vigorous reaction took place even at this low temperature. The temperature was gradually raised to 260° C. and at the end of three days the rate of conversion was 17% to ethylene oxide with a total reaction of 93%. Thereafter, the conversion to ethylene oxide rose steadily and at the end of two weeks attained 45% with the total reaction remaining at about 93%. Thereafter, the conversion remained substantially constant.

The period required for the catalysts to attain maximum activity in ethylene oxide production can be considerably reduced at the same time that the temperature control during the initial use of the catalyst is simplified by treating the activated catalyst with carbon dioxide in the manner set forth above, e. g. in Examples 1 and 2, and the nickel-containing catalysts show a superior life to the nickel-free catalysts even when the nickel-containing catalysts have not been treated with carbon dioxide preliminary to use as a catalyst.

The invention in its broader aspects is not limited to the specific steps, processes and compositions shown and described but departures may be made therefrom within the scope of the accompanying claims without departing from the principles of the invention and without sacrificing its chief advantages.

What is claimed is:

1. A process for the activation of silver-bearing oxidation catalysts which comprises treating a silver-alkaline earth metal alloy having at least about 25% silver on its surface and from which a substantial part of the alkaline earth metal has been removed, which comprises subjecting the resulting material to treatment with carbon dioxide for a prolonged period at from about 260° to about 350° C.

2. A process as claimed in claim 1 in which the silver bearing alloy contains from about 0.1% to about 3.0% nickel.

3. A process as claimed in claim 2 in which the carbon dioxide treatment is at about 290° C.

4. A process for the activation of silver-bearing oxidation catalysts which comprises applying the silver bearing alloy to a metal base member, annealing the base member and alloy at a temperature in the range of about 400° to 660° C. and in an inert atmosphere, thereafter removing from the surface of the annealed silver-bearing alloy surface a substantial portion of the alkaline earth metal contained therein, and activating the surface of the alloy by subjecting it to prolonged treatment with carbon dioxide in the temperature range of about 260° to 350° C.

5. A process as claimed in claim 4 in which the activation is at about 290° C.

6. A process as claimed in claim 4 in which the silver-bearing alloy contains from about 0.1 to about 3.0% nickel.

7. A process for the activation of silver bearing oxidation catalysts which comprises treating a silver-alkaline earth metal alloy having at least about 25% silver on its surface to remove from 5 to 99% of the alkaline earth metal from the surface of the alloy and subjecting the resulting material to treatment with carbon dioxide for a prolonged period at from 260° to 350° C.

8. A process as claimed in claim 7 in which the carbon dioxide treatment is at about 290° C.

9. A process for forming silver bearing oxidation catalysts which comprises coating a metal base member with a silver-alkaline earth metal alloy, annealing the alloy coated metal base member, and etching away from 5 to 99% of the alkaline earth metal whereby the surface of the silver alloy contains a silver-alkaline earth metal composition containing at least about 25% silver and subjecting the resulting material to treatment with carbon dioxide for a prolonged period at from about 260° to about 350° C.

10. A process as claimed in claim 9 in which the annealing is carried out at from about 400° to about 660° C.

11. A process as claimed in claim 10 in which the carbon dioxide treatment is carried out at about 290° C.

12. A process as claimed in claim 9 in which the annealing is carried out at from about 500° to about 640° C.

13. A process as claimed in claim 12 in which the alloy contains from about 0.1% to about 3.0% nickel.

References Cited in the file of this patent

UNITED STATES PATENTS

| Number | Name | Date |
|---|---|---|
| 2,477,435 | Aries | July 26, 1949 |
| 2,562,858 | Cambron et al. | July 31, 1951 |
| 2,636,011 | Clark | Apr. 21, 1953 |